Aug. 28, 1962     C. FIELD     3,050,825
METHOD AND MACHINE FOR MAKING METAL WOOL AND SIMILAR PRODUCTS
Filed Oct. 4, 1955     10 Sheets-Sheet 1

INVENTOR.
CROSBY FIELD
BY Gustav Drews
his ATTORNEY

Aug. 28, 1962 C. FIELD 3,050,825
METHOD AND MACHINE FOR MAKING METAL WOOL AND SIMILAR PRODUCTS
Filed Oct. 4, 1955 10 Sheets-Sheet 3

INVENTOR.
CROSBY FIELD
BY Gustav Drews
h.'s ATTORNEY

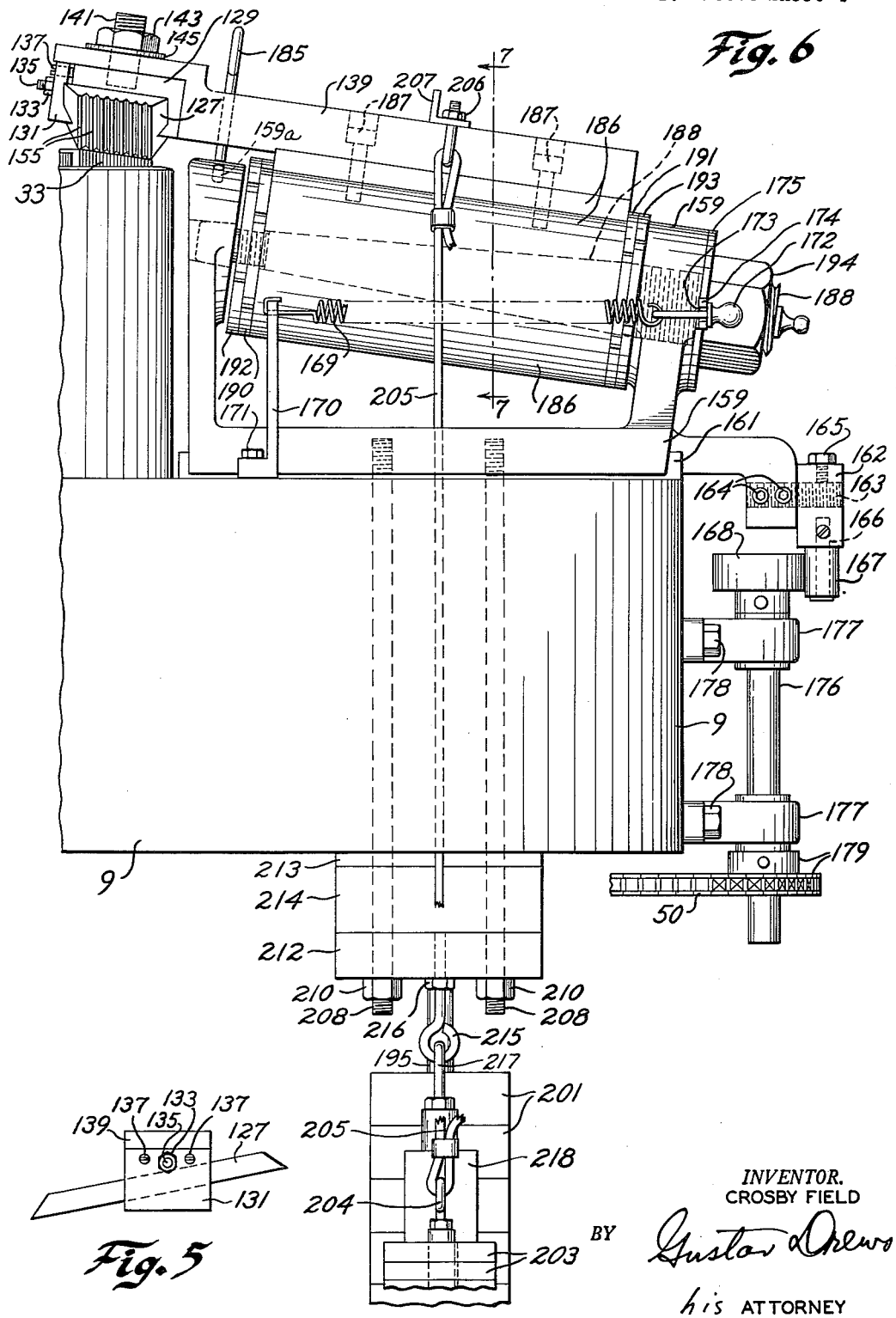

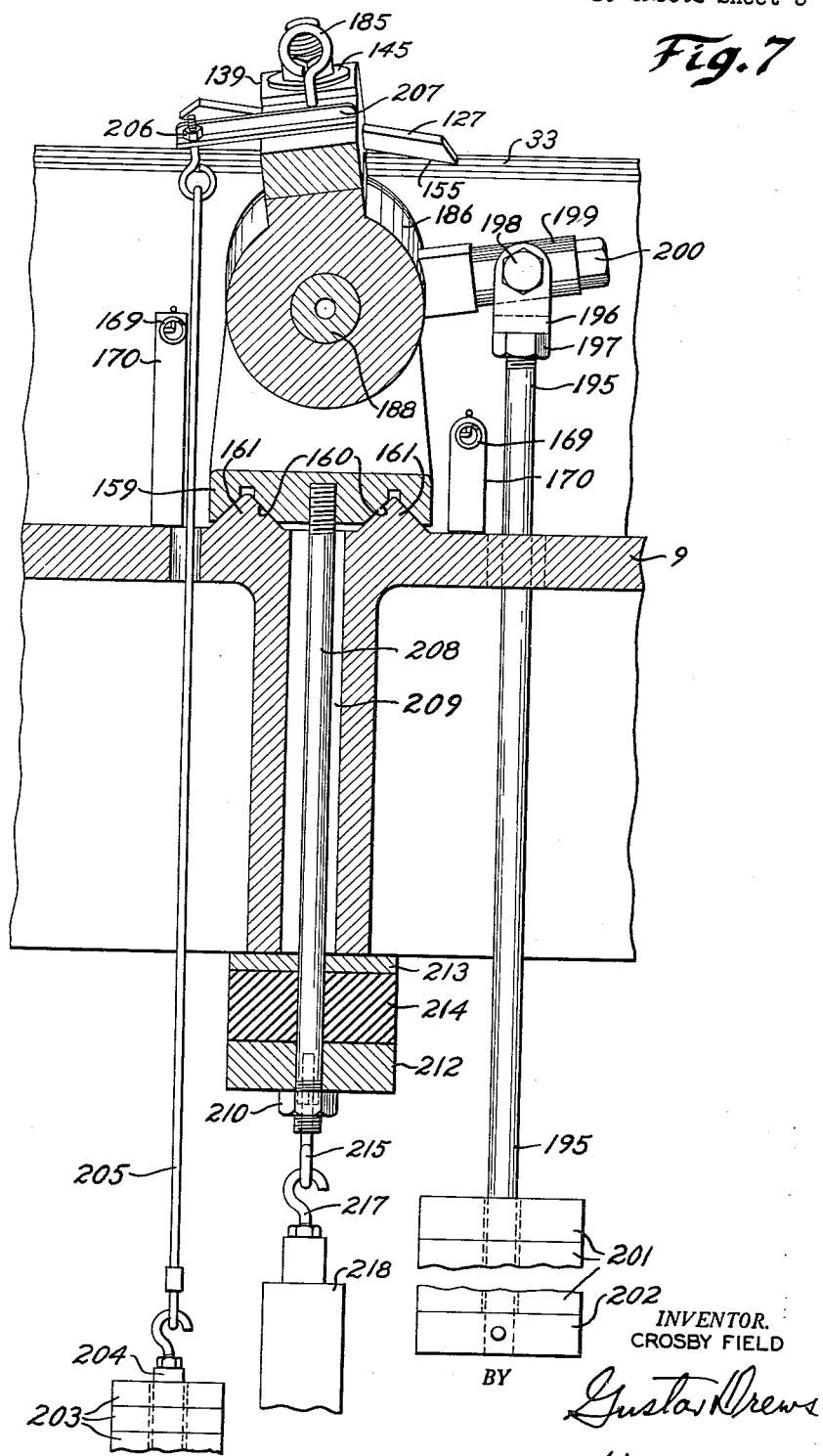

Aug. 28, 1962   C. FIELD   3,050,825
METHOD AND MACHINE FOR MAKING METAL WOOL AND SIMILAR PRODUCTS
Filed Oct. 4, 1955   10 Sheets-Sheet 6
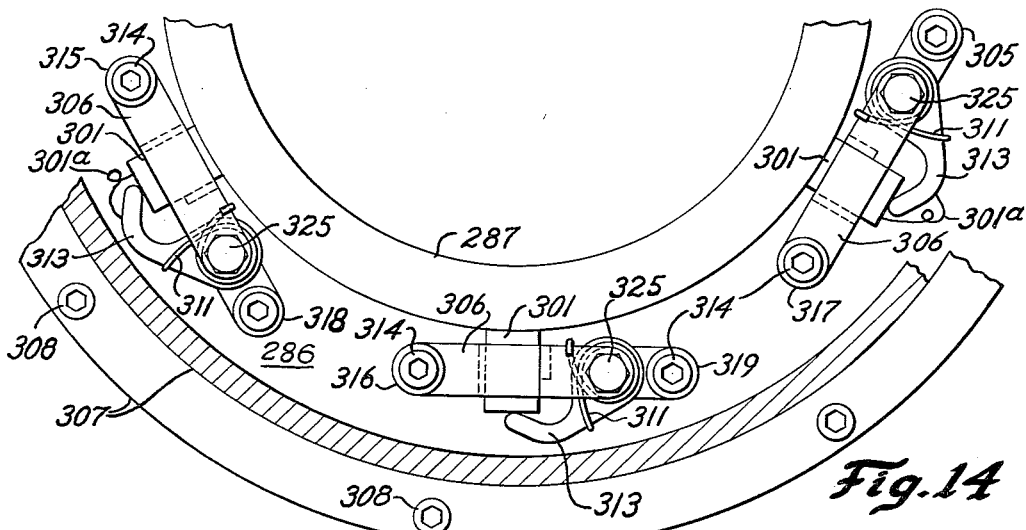
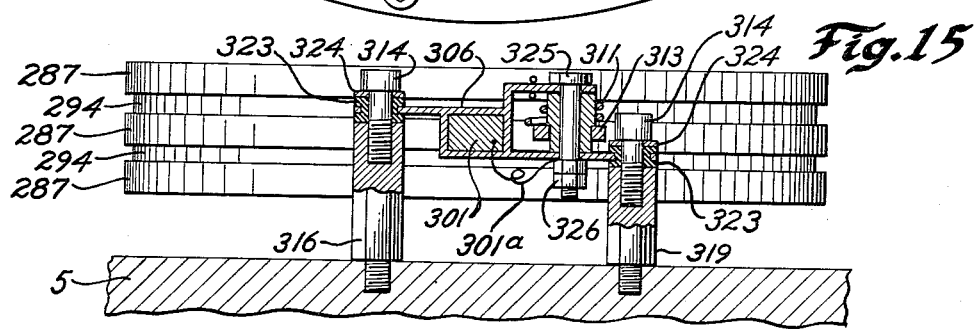
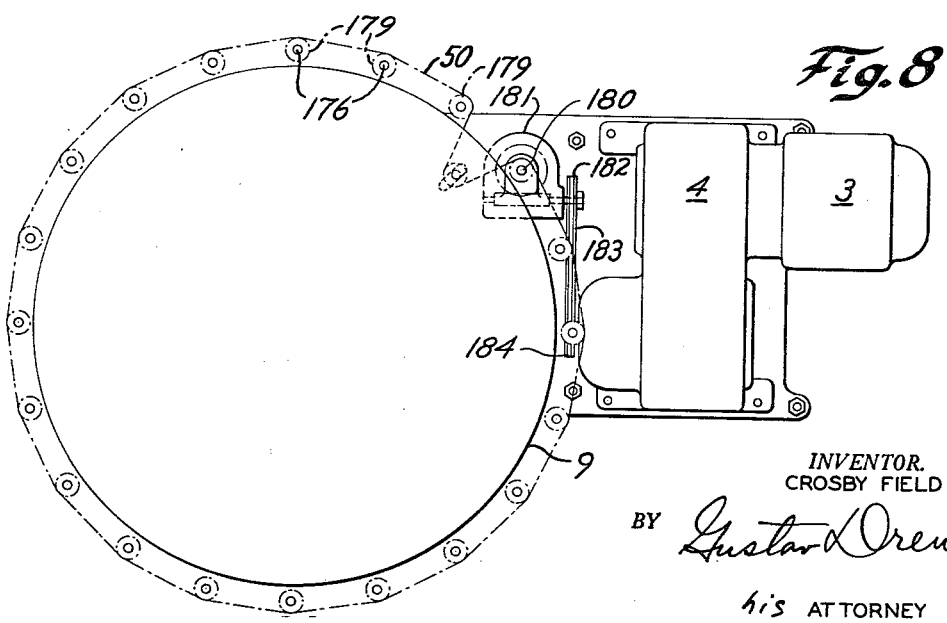
INVENTOR.
CROSBY FIELD
BY *Gustav Drews*
his ATTORNEY Aug. 28, 1962 C. FIELD 3,050,825
METHOD AND MACHINE FOR MAKING METAL WOOL AND SIMILAR PRODUCTS
Filed Oct. 4, 1955 10 Sheets-Sheet 7

INVENTOR.
CROSBY FIELD
BY Gustav Drews
his ATTORNEY

Aug. 28, 1962  C. FIELD  3,050,825
METHOD AND MACHINE FOR MAKING METAL WOOL AND SIMILAR PRODUCTS
Filed Oct. 4, 1955  10 Sheets-Sheet 8
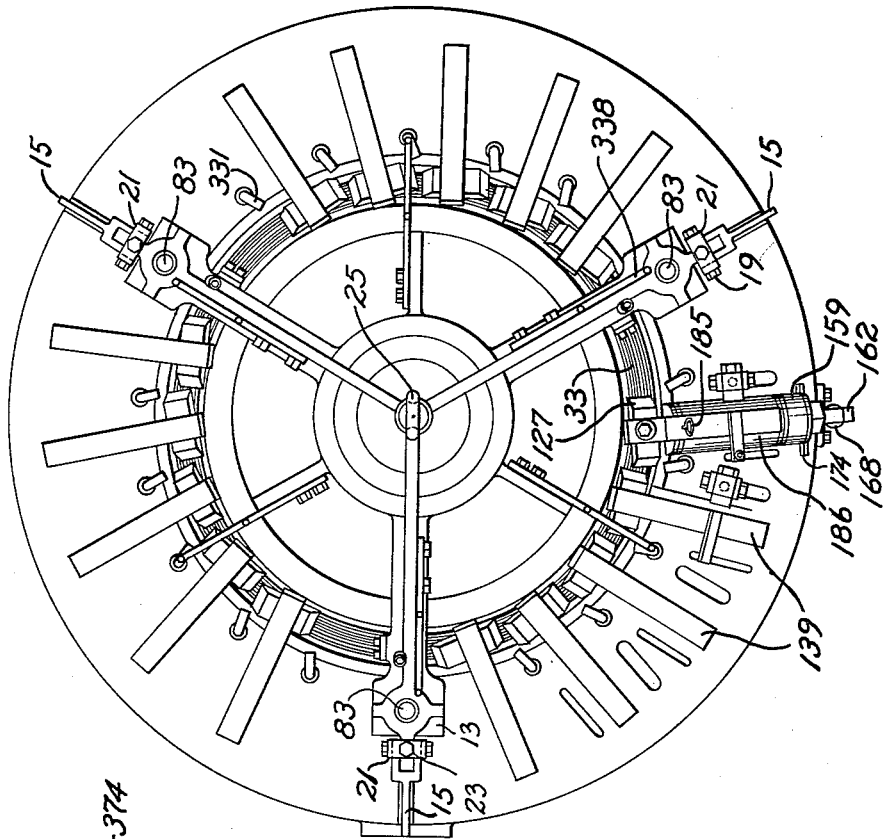
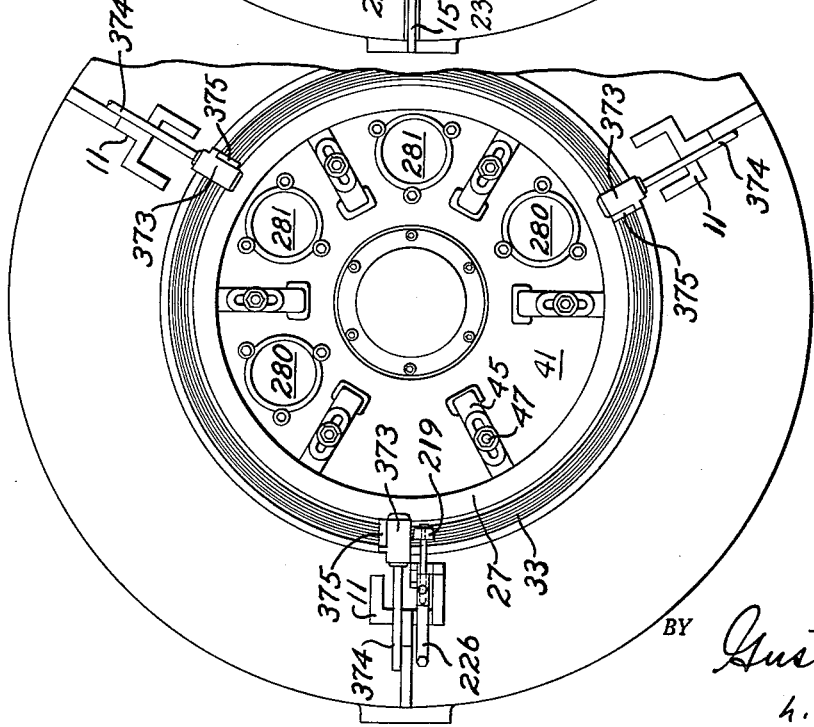
INVENTOR.
CROSBY FIELD Aug. 28, 1962  C. FIELD  3,050,825
METHOD AND MACHINE FOR MAKING METAL WOOL AND SIMILAR PRODUCTS
Filed Oct. 4, 1955  10 Sheets-Sheet 9
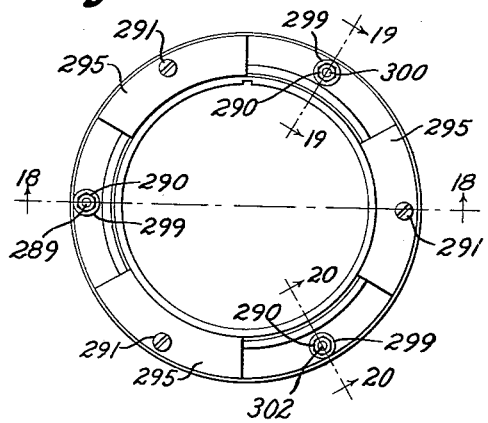
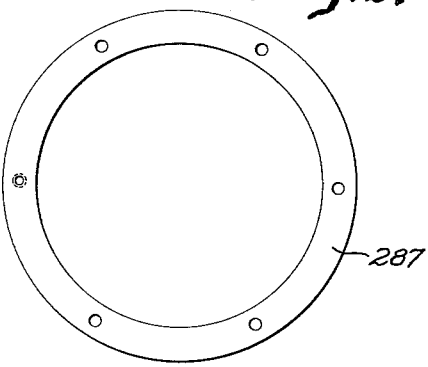
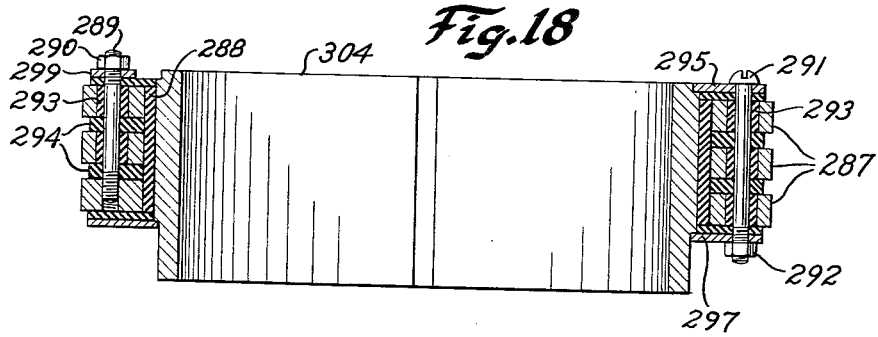
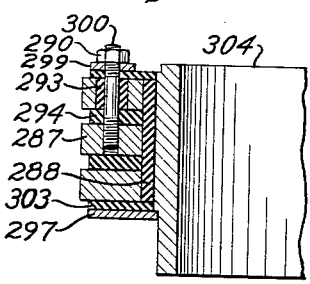
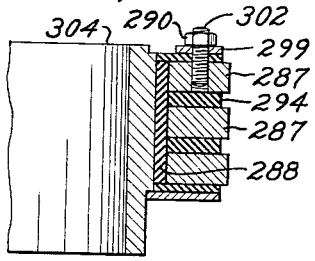
INVENTOR.
CROSBY FIELD
BY Gustav Drews
his ATTORNEY Aug. 28, 1962     C. FIELD     3,050,825
METHOD AND MACHINE FOR MAKING METAL WOOL AND SIMILAR PRODUCTS
Filed Oct. 4, 1955     10 Sheets-Sheet 10
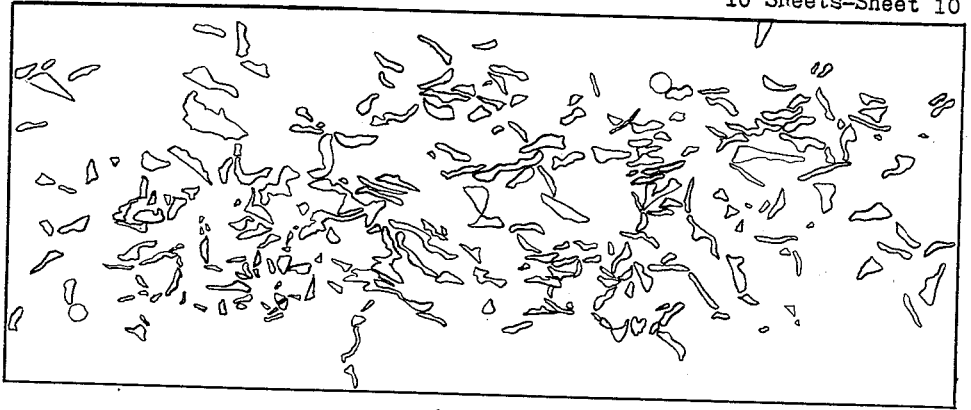
Fig. 22
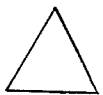    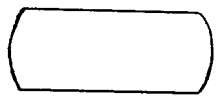    
Fig. 21    Fig. 23    Fig. 24
Fig. 25    Fig. 26
INVENTOR
CROSBY FIELD
BY Gustav Drews
his ATTORNEY

United States Patent Office 3,050,825
Patented Aug. 28, 1962

3,050,825
METHOD AND MACHINE FOR MAKING METAL WOOL AND SIMILAR PRODUCTS
Crosby Field, 360 Furman St., Brooklyn 1, N.Y.
Filed Oct. 4, 1955, Ser. No. 538,362
4 Claims. (Cl. 29—4.5)

This invention relates to apparatus for, and methods of, making metal wool and similar products from metal in the form of long sheets or strips.

In the production of metal wool from strips, the metal strip used has been produced by passing long strips of metal between rolls, thereby reducing the thickness with corresponding increase in length, and simultaneously obtaining the special physical properties in the metal desired for the intended use. Due to the heavy pressures required on the bearings of the rolls, the rolls bent slightly under the load with the result that the strip produced was not of uniform thickness measured across its width. Usually the thickest section was at or near the middle, although thick spots might occur at other locations.

When the strip was coiled so that its edge surface could be shaved by a serrated cutting tool to produce steel wool, the surfaces of the strip were in contact only at their greatest thickness. This resulted in spaces between the turns at other locations. These spaces were of the same magnitude as the finer grades of wool. In cutting, therefore, the edges of the strip would move under the side thrust of the serrated tool, producing differences in the width of the fibers being cut to produce definitely non-uniform wool.

With the aforesaid objection in mind, the present invention aims to provide an improved method and machine for producing metal wool from strips, which wool is substantially uniform without in any way impairing the quality produced.

It is still another object of the present invention to provide an improved method and machine for producing metal wool from strips, making possible the economical production not only of large quantities of metal wool of extremely course grades but also of the finest grades.

Furthermore, it is an object of the present invention to provide a method and machine for producing on a large scale a new type of metal fiber as well as the standard metal wool today in use. The new type of metal fiber to be designated "angle grass" made possible by this invention is characterized by two relatively wide parallel surfaces and two very narrow surfaces, the narrow surfaces being at an angle to the wide surfaces and thus presenting sharper cutting edges when the fibers are used for scraping or cleaning the surface of metal, wood or other material.

It is still another object of the present invention in the interest of producing substantially uniform metal wool from strips to provide a method and machine characterized by cutting the strip at a slight angle to the surface of the edge instead of normal to the surface of the edge, which angle may vary depending upon the factors involved such as the material, its physical properties, the variation in the thickness of the strip and the like. More specifically, it is an object of the present invention to provide a method and machine for producing metal wool from steel strips characterized by cutting the strip at an angle of about 8° to the surface of the edge.

Heretofore in the manufacture of metal wool from strips, difficulty has been encountered in adjusting the rate of feed of the strip to the large number of cutting tools involved, since these all vary in the depth of cut due to variation in the rate of dulling while in use and other factors. With this difficulty in mind, it is an object of the present invention to produce a method and machine characterized by using a floating knife tool holder whereby the cutting edge of each knife automatically adjusts itself to the level of the surface of the strip as it is being cut. In other words, during the cutting operation before the change in level has become so large in turn to effect a change in the cutting angle that the cutting has been noticeably affected, an automatic levelling device advances the strip to remedy the defect.

It is still another object of the present invention to provide a method and machine for shaving into wool not only ferrous and a non-ferrous metal, but also plastics, soaps, solid abrasives, mixtures thereof and many other materials.

In the manufacture of steel wool from wire, because of technological reasons it is necessary to leave uncut a portion of the wire. This uncut scrap wire varies from 15% to 25% or more, depending upon the characteristics of the wire and of the machine cutting it. With the latter loss in mind, it is an object of the present invention to produce a method and machine for cutting metal wool from strip resulting in the loss of uncut strip of less than 3% of the original strip, which latter uncut strip moreover can be utilized to advantage in the manufacture of other items.

Furthermore, in order to obtain maximum efficiency with machines producing steel wool from wire, it has been necessary to consume the entire conservable portion of the wire in a single pass. These machines necessarily are large and expensive, and the parts thereof produced in one location are so large that the shipping, transportation and distribution are extremely expensive. With this disadvantage in mind, it is another object of the present invention to produce a relatively small machine which will efficiently produce metal wool at or near the place where it is consumed, thus making large overall savings.

These and other features, capabilities and advantages of the present invention will appear from the subjoined detailed description of one specific embodiment of the machine constituting the machine part of this invention and for carrying out the method part of this invention illustrated in the accompanying drawings, in which FIG. 1 is an elevation of the assembled machine, also showing diagrammatically the wool "take-off" machanim.

FIG. 5 shows the knife or cutting tool clamped in the tool holder vise.

FIG. 6 is the rear elevation of the tool holder and its supporting mechanism.

FIG. 7 is a sectional elevation of the tool holder and its supports taken on line 7—7 of FIG. 6.

FIG. 8 is a diagrammatic view of the device for effecting the radial movement of the tool holder.

FIG. 12 is a plan view of the machine just above the tool holders.

FIG. 13 is a fragmentary plan view, with the top portion of the machine removed.

FIG. 14 is an enlarged fragmentary plan view of the brush holder subassembly.

FIG. 15 is an enlarged fragmentary elevation of the brush holder subassembly.

FIG. 16 is a plan of the collector ring subassembly.

FIG. 17 is a plan view of a collector ring.

FIG. 18 is a sectional elevation along the line 18—18 of FIG. 16.

FIG. 19 is a sectional elevation along the line 19—19 of FIG. 16.

FIG. 20 is a sectional elevation along the line 20—20 of FIG. 16.

FIG. 21 shows a fiber of present day steel wool, theoretically diagrammed, but rarely obtained in commerce.

FIG. 22 is a highly magnified cross section of a ribbon composed of many fibers of present day commercial steel wool.

FIG. 23 is a section of a roll-flattened round wire.

FIG. 24 is a section of "steel grass" made in Europe.

FIG. 25 is a cross section of a fiber of the new "angle grass."

FIG. 26 is a cross section of a smaller fiber of the "angle grass."

Figures 1, 4, 4A:
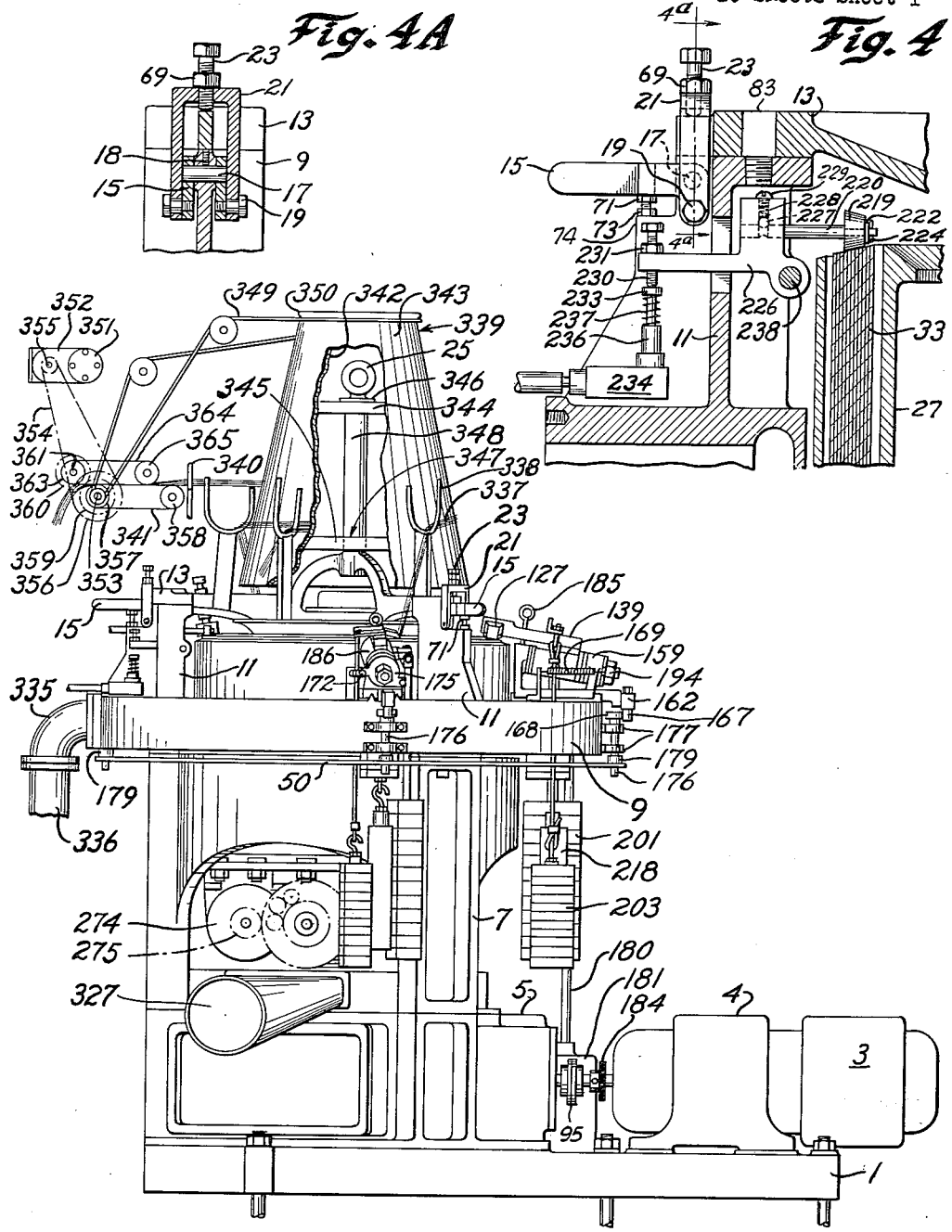
FIG. 4 is a fragmentary sectional elevation showing the locking device for the removable portion of the machine.
FIG. 4A is a fragmentary sectional elevation on line 4A—4A of FIG. 4.
Figure 2:
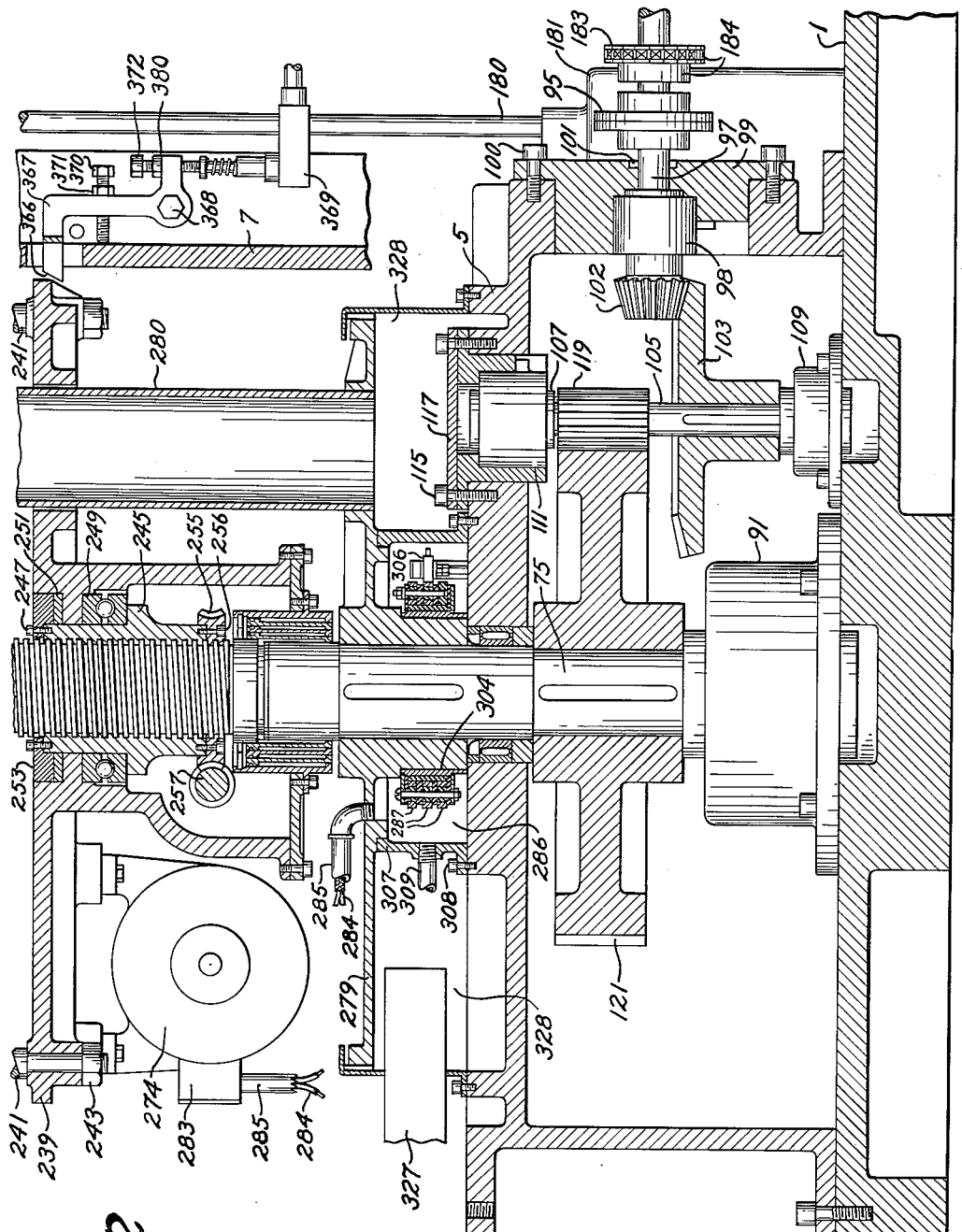
FIG. 2 is a sectional elevation of the lower portion of the machine.
Figure 3:
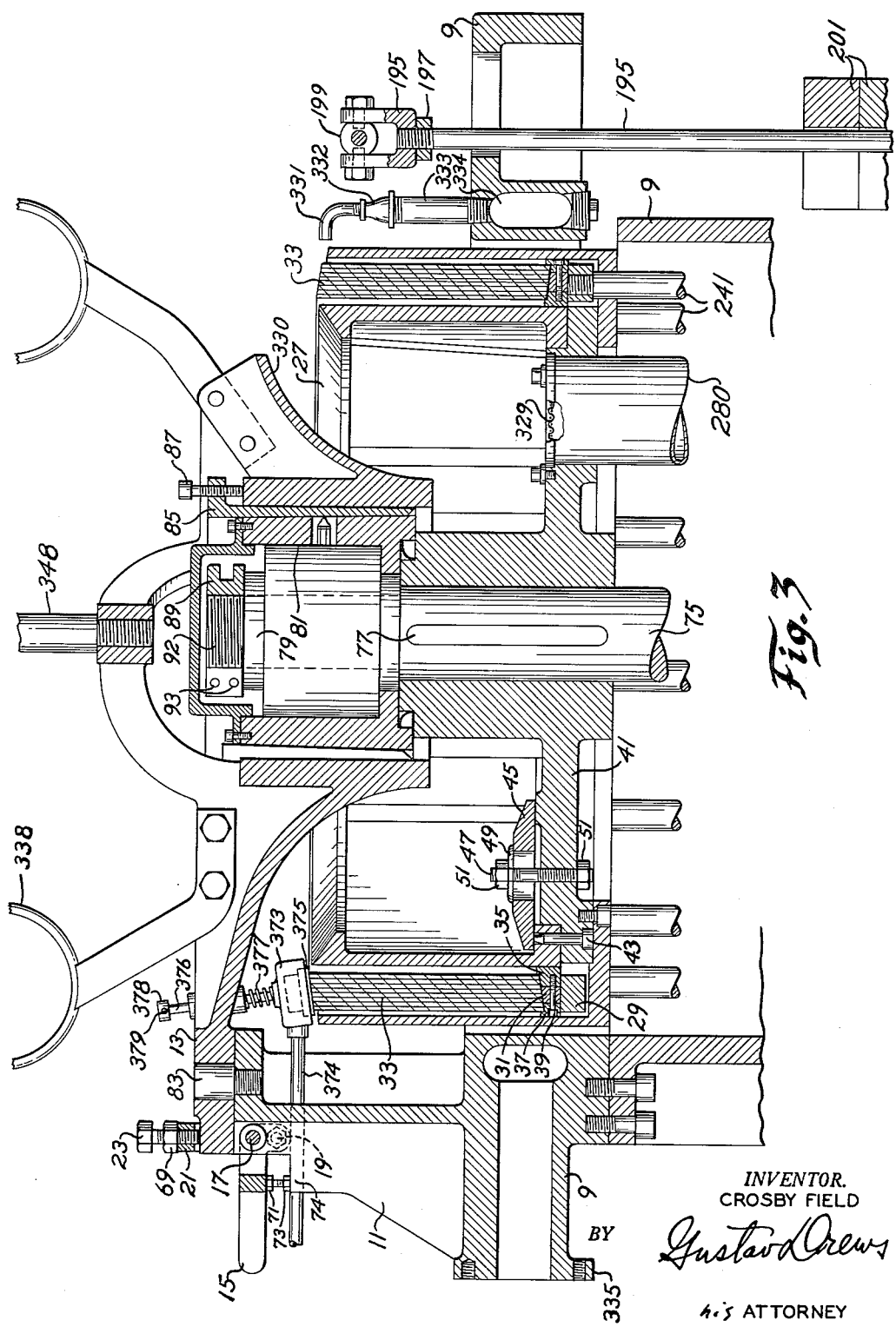
FIG. 3 is a sectional elevation of the upper portion of the machine, without the wool collecting cone.
Figure 10:
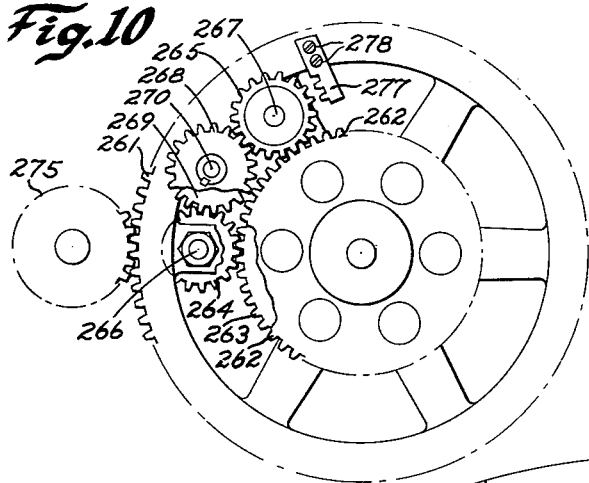
FIG. 10 is a detail view of the gears of the elevator mechanism, shown diagrammatically in FIG. 1.
Figure 11:
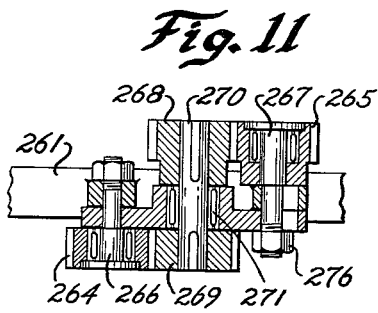
FIG. 11 is a fragmentary section of FIG. 10.

In the embodiment shown, see FIGS. 1, 2 and 3, the frame of the machine comprises a base plate 1 to which is bolted the main drive motor 3, the adjustable speed reducer 4 operatively connected to the motor 3, the main drive gear box 5, the main frame column 7, and the tool holder bed 9. To the tool holder bed 9, there are permanently fastened the three posts 11 to the tops of which are detachably fastened the top bracket 13.

The machine is prepared for operation by raising the hands of the three bell crank levers 15, each of which swings about its pin 17, see FIGS. 4 and 4A. By means of the studs 19 the short arm of the clamp lever 15 swings the clamp yoke 21 about its fulcrum at the lower end of its adjusting screw 23 which has been resting on the bracket 13, thus quickly freeing the yoke 21 from the top bracket 13. The clamp yokes 21 may then be swung out of the way and the top bracket 13 with all of its attachments may then be raised by a hoist with its hook through ring 25, FIG. 1.

With regard to the subassembly, see FIGS. 3 and 13, comprising the mandrel 27, the strip ring 29, the clamp ring 31, the strip 33 to be shaved into wool, and the inside 35 and outside clamp jaws 37 tightly clamping and fastening to the ring 31 the lower end of the strip 33 by means of the screws 39 it is disclosed, Patents Nos. 2,700,812, 2,605,741 and 2,700,811.

The entire mandrel subassembly is lowered by a hoist into position, FIGS. 1, 3 and 13, and the mandrel 27 is made fast to the rotor 41 and centered by the dowels 43 and the clamps 45. The clamps 45 are held to the rotor 41 by means of the studs 47, the washers 49, and the nuts 51, when tightened. The top bracket 13 is then lowered into position, centered by means of the dowels 83, FIGS. 3 and 4, and made fast to the posts 11 by the lever operated yokes 21 aforesaid. This clamp mechanism is provided with a screw 23 by turning which the pressure of the bracket 13 on the post 11 may be regulated, and this screw 23 is otherwise prevented from turning by the lock nut 69. Similarly the yoke 21 is prevented from passing through the center line of maximum pressure by the stop screw 71 which is locked in position by the lock nut 73 pressing on the lug 74 on the post 11.

The main vertically extending shaft 75, see FIG. 3, is fastened to the rotor 41 by means of the key 77, and rotates in the top roller bearing 79 carried in a sleeve 81 which is held firmly in the hole of the top bracket 13 by means of a taper lock sleeve 85 which is adjustable by means of the screws 87. The weight of the main shaft 75 and the parts it supports is carried top and bottom by the thrust nut 89 at the top, FIG. 3, and the thrust and radial anti-friction bearing 91 at the bottom, FIG. 2. The thrust nut 89 is slotted and then is screwed onto the threaded portion 92 of the main shaft 75 and then is locked in place by clamp screws 93.

Power is supplied from the shaft (not shown) of the main drive motor 3, FIG. 2, through the coupling 95 to the shaft 97 rotating in the bearing 98. The bearing 98 is held in the sleeve 99 which is fastened to the main gear box 5 by screws 100. The oil seal 101 prevents oil leakage. The shaft 97 is fastened to the bevel pinion 102 which in turn drives the bevel gear 103. The gear 103 is keyed to the vertical jack shaft 105 revolving in bearings 107 and 109. The bearing 107 is fastened in the sleeve 111, and the bearing 109 is held in the base plate 1. The sleeve 111 is attached to the gear case housing 5 by screws 115. The screws 115 also hold the cover plate 117 in place.

The jack shaft 105 carries the spur pinion 119 which drives the large spur gear 121 keyed to the main shaft 75, thus rotating the rotor 41 and the coil of strip 33, FIG. 3.

The electrical controls for starting and stopping the rotor 41, the blower and the exhauster subsequently to be described are not shown as they are well known in the art.

When the rotor 41 is brought into motion, the operator places the shaving knife in cutting position. To do this he takes the knife 127, see FIGS. 1, 5, 6 and 7, and places it in the vise formed by the blocks 129 and 131, see FIG. 6. These blocks 129 and 131 are drawn together by turning the nut 133 on the stud 135 attached to the block 129. Twisting of the block 131 as it is drawn tight is prevented by the two spacer screws 137, FIG. 5, inserted in the block 131. The block 129 is carried on the tool holder top 139 by a stud 141, nut 143 and washer 145. The shaving knife 127 has its side edges tapered as shown so as to be firmly grasped by the vise blocks 129 and 131. Its shaving serrations 155 may be of the form well known in the art.

The base of the tool holder subassembly is a slide 159 in which are V grooves 160, see FIG. 7, which fit the lands 161 machined on the tool holder bed casting 9, and enables the operator to slide the entire subassembly together with its weights into a position over the strip 33 to be cut, as shown in FIG. 1, or to withdraw it so as to clear the rotor 41 as the latter is moved up for loading or down after loading. The subassembly is moved into the cutting position which has been predetermined by the block 162, FIG. 6, attached to the tool holder slide 159 by adjusting screw 163 which is locked after adjustment by the set screws 164 and 165. The block 162 carries the stud 166 of the cam follower roller 167 which is held against the cam 168 by the springs 169, attached to the bed plate 9, by the bracket 170 and screw 171. The free end of the spring 169 is connected to the button 172 which the operator places in the slot 173 in the bar 174 attached to the washer 175.

The cam 168 is fastened to the vertical shaft 176 carried in the bearings 177 fastened to the bed plate 9 by the screws 178. The sprocket 179 is keyed to the shaft 176 at its lower end, and meshes with the chain 50 which connects all the sprockets 179, see FIGS. 1 and 8, so that the shafts 176 rotate simultaneously and with uniform velocity. One sprocket 179 has instead of the shaft 176, the longer shaft 180, FIGS. 1 and 8, which extends into the gear reducer 181 driven by the sprocket 182 and the chain 183 from the sprocket 184 rotating on the shaft of the reducer 4 which also drives the bevel pinion 102 (FIGURE 2) through the coupling 95. The tool holder top 139 is attached to the tool holder base 186 by the screws 187. This base 186 rotates a small fraction of a revolution on its tapered shaft 188. The friction resisting this rotation is determined by the rear and front tool holder thrust nuts 190 and 191. The lock nuts 192 and 193 prevent these thrust nuts from turning during the operation. The work holder top 139 has mounted in it for vertical sliding movement an eye pin 185 whose lower end comes into alignment with a detent 159a in the slide 159 when the tool holder top 139 and base 186 are rotated to a position to remove the cutting edge of the knife 127 from engagement with the strip 33, thereby locking the knife 127 in this position. To lower the knife into cutting position, the operator pulls the eye pin 185 to remove its lower end from the detent 159a allowing the cutting edge of the knife 127 to be lowered into engagement with the strip 33.

The shaft 188 is held firmly at one end by the tapered hole in the slide 159, into which it is forced by being turned in the threaded portion of the slide 159. Once positioned the shaft 188 is locked by the nut 194.

The rod 195 is threaded at its upper end, so that it is screwed into the clevis 196 and locked tight by the nut 197. The screws 198 support the clevis 196 and the rod 195 in the sleeve 199 which can turn on the screw 200, which holds the sleeve 199 to the tool holder base 186.

The weights 201 and 202 on the rod 195, FIG. 7, turn the tool holder 186 clockwise when viewed from the operator, until the knife 127 presses its serrations 155 against the surface of the strip 33. The amount of this pressure is the difference in torque developed by the weights 201 and 202 on the rod 195 in a clockwise direction and the torque developed in a counter-clockwise direction by weights 203 on the rod 204, the upper end of which is connected to the cable or chain 205 which is attached to the tool holder 186 by the eye screw nut 206, and arm 207 welded to tool holder top 139. The greater the net weight effect, the deeper the cut for any given knife of a certain number and profile of serrations. Weights 201 may be increased or diminished. Weight 202 is attached firmly to the rod 195. By the means just described, a small net pressure on the knife 127 may be obtained in order to cut fine sizes, commonly called "grades," of wool, and simultaneously sufficient inertia is placed into the tool holder to prevent chatter.

It has been found to be of assistance in the elimination of chatter to provide considerable inertia to the tool holder slide as well as to the tool holder. This is accomplished by attaching to the tool holder slide 159 two rods 208, free to be moved laterally in the slot 209 in the tool holder base 9. The rods 208 carry by means of nuts 210 at their lower end a block 212, separated from the undersurface of the bed 9 by the plate 213, and a rubber cushion 214, so as to maintain a yieldable pressure on the undersurface of the bed 9. To this block 212, there is attached the screw eye 215 with the lock nut 216 into which the upper hooked end of the rod 217 is placed. The rod 217 carries the heavy weight 218.

As the strip is shaved by the knives, the level of the surface of the strip 33 falls, and the knives 127 rotate slightly upon their fixed shafts 188. The change in the angle at which the knife contacts the strip 33, thus created will have an effect upon the cutting and will also tend to change the size and the quality of the fiber. It has been found, however, that both these effects are not discernible if the change in angle is kept very small. For example, but only as a simple example, as the machine has been operated successfully under other conditions, it has been found that a change in angle of about one-half a degree does not make any measurable difference, and that this is obtained by setting the limit switch mechanism about to be described so that it operates to raise the strip 33 between five one thousandths and eight one thousandths of an inch during each operation of the elevator.

On the cut surface, FIG. 4, of the strip 33 there lightly rides the roller 219 on the shaft 220 and it is maintained in longitudinal position on the shaft 220 by a shoulder on one side and a washer 222 and cotter pin 224 on the other side. The shaft 220 is slidable in the bell crank 226 but is prevented from sliding during the cutting operation by the ball lock 227 which under the influence of the spring 228 presses into a detent in the shaft 220. This spring is held in place by the screw 229, attached to the bell crank swivel arm. The long arm of the bell crank 226 carries an adjusting screw 230 which can be locked in place by the nut 231 and which presses upon the plunger 233 of the limit switch 234. The plunger 233 operates in a guide 236 under the influence of a spring 237 on the one hand and of the roller 219 on the other, as the arm 226 turns in one direction or the other about the stud 238. When the arm 226 is at its upper limit, the switch 234 is closed, energizing the elevator motor. As the elevator ring 29 forces the strip 33 upwards, the roller 219 swings the arm 226 counter-clockwise, until the plunger 233 opens the limit switch 234, stopping the rise of the elevator by deenergizing the elevator motor 274. As the knives cut the strip, the roller 219 falls, causing clockwise rotation of the arm 226. When the arm 226 causes the plunger 233 to reach its highest limit, the switch 234 closes, energizing the elevator motor, thus beginning a new cycle.

Referring now to FIGS. 2, 3, 9, 10, 11 and 12, the elevator includes a base 239. Plungers 241 are shouldered and threaded at the bottom end, and are fastened to base 239 by the nuts 243, FIG. 2. At the top end these plungers are threaded, and are screwed into the strip ring 29, FIG. 3, which supports the coil of strip 33.

Figure 9:
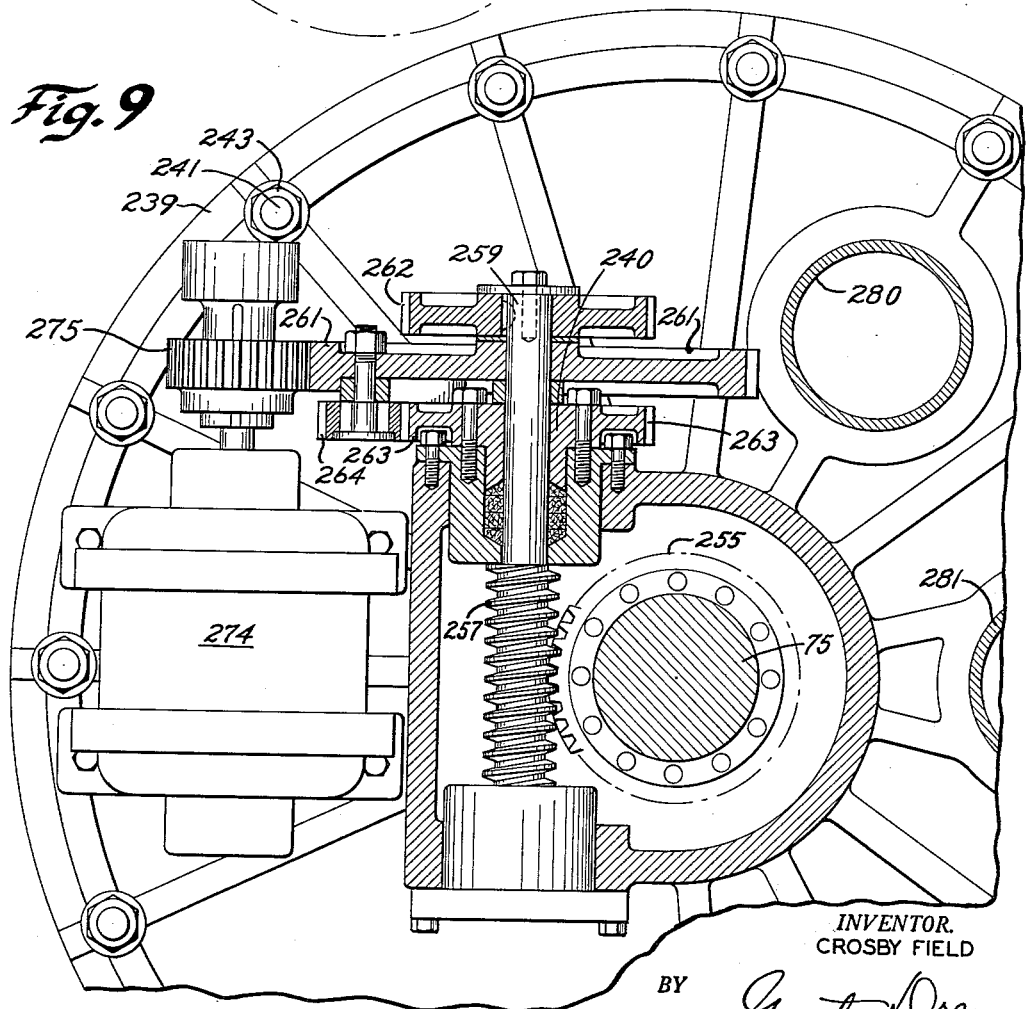
FIG. 9 is a fragmentary plan view of the elevator mechanism taken from the bottom and partially in section.

The elevator base 239 rotates on the traction nut 245, longitudinal movement on which is prevented by the ball thrust bearing 249 and the thrust washer 251 constrained by the ring 253 fastened to the nut 245 by screws 247. The threads on the inner surface of the nut 245 fit the threads on the threaded portion of the main drive shaft 75. The worm gear 255 is fastened to the nut 245 at its lower end by the screws 256 and meshes with the worm 257. The worm 257, FIG. 9, is integral with the shaft 259 which carries the spur gear 261 and the spur gear 262 which latter gear is keyed to the shaft 259. The gear 261 is free to rotate on the shaft 259. The sun gear 263 is fastened to the base 239, the hub 240 of the gear forming the gland for the shaft 259 where it extends out of the gear box. The gear 261 carries the planetary pinions 264 and 265 on the studs 266 and 267, which in turn are fastened to the web of the gear 261. The pinions 268 and 269 are keyed to the shaft 270 which is rotatively mounted in the bearing 271 in the web of the gear 261. The pinion 264 meshes with the sun gear 263 and also meshes with the pinion 269. The pinion 268 meshes with the pinion 265, which in turn meshes with the gear 262.

When the motor 274 is energized, its pinion 275 meshing with the gear 261 causes it to rotate. This rotation carries the pinion 264 about the stationary sun gear 263, the pinion 269 meshing with the pinion 264 is caused to rotate, which motion is transmitted to the pinion 268 through the shaft 270 rotating in the bearings 271. The pinion 268 in turn drives the pinion 265, rolling it about the gear 262. This planetary gear system, because of the difference in number of teeth between the stationary sun gear 263 and the driven gear 262 produces a great reduction in speed between the motor pinion 275 and the gear 262.

The gear 262 is keyed to the shaft 259, so that when the motor 274 is energized, the nut 245 will turn on the main shaft 75, and will raise or lower the elevator 239 depending upon the direction of rotation of the motor 274, there being no relative motion between the elevator base 239 and the nut 245 except when the motor 274 is running. When the elevator motor 274 is deenergized, the elevator 239 will not move vertically, but will retain its level. A rise of the elevator base 239 pushes upwards the plungers 241 which correspondingly raise the strip ring 29, raising the surface of the strip 33 being cut.

As a much greater speed of the elevator base 239 downward with the strip 33 not yet being cut is needed, provision for the same is made in the following fashion. With the elevator motor switch open, the nut 276 on the shaft 267 is loosened, and the pinion 265 rolled about the gear 262 until it is out of mesh with the pinion 268 and is in mesh with the rack 277 attached to the gear 261 by the screws 278. The shaft 267 travels freely in a slot in the gear 261. The nut 276 is then tightened. The pinion 265 cannot now rotate, but acts as a lock between the gear 262 and the gear 261. The gear 262 must therefore rotate at the same angular speed as does the gear 261, thus rotating the worm shaft 259 at a much higher speed. The other pinions remain in mesh, as shown, but merely idle as the pinion 264 rolls about the sun gear 263.

The exhaust cover rotor 279 is keyed to the main shaft 75, FIG. 2, and provides the lower support for four tubes, two of which, 280, turn the elevator base 239, see FIGS. 2 and 13, and are also fastened at their top ends to the rotor 41. As both the rotor 41 and the main shaft 75 rotate together these tubes 280 turn the elevator base 239 with it relative to the nut 245. Two more tubes 281 are suported the same way, but are used merely to carry air to the exhauster.

The elevator base 239 rotates with the main shaft 75, being driven by the torque tubes 280. These torque tubes 280 are carried by the rotor 41 at the top end and the exhaust cover casting 279 at the lower end. Both the rotor 41 and the exhaust cover casting 279 are keyed to the main shaft 75.

The traction nut 245 controls the vertical position of the base 239 with respect to the rotor casting 41 and the exhaust casting 279.

The traction nut 245 engages the threads on the main shaft 75 and rotates relative to this shaft and the elevator casting 239. When the motor 274 is not running, the worm 257 prevents movement of the nut 245 with respect to the base casting 239, the shaft 75, nut 245 and base casting 239 then rotating as a unit.

When the motor 274 is in operation it causes the nut 245 to turn inside of the base casting 239, the nut 245 to move either up or down depending on the direction of rotation of the motor 274.

The elevator motor 274 carries on its frame the motor terminal box 283 from which leads 284 are carried through the flexible conduit 285 into the chamber 286, and then are connected to the slip rings 287, FIGS. 2, 14, 15, 16, 17, 18, 19 and 20. These slip rings are attached to the hub of the exhaust cover rotor 279 from which they are electrically insulated by the insulation bushing 288. The slip or collector rings 287 are clamped together by the studs 289, 300, 302, the nuts 290 and the holding screws 291 and the nuts 292, from which they are insulated by the bushing 293, which together with the insulated washers 294 also hold the slip rings 287 insulated from each other. The segmental metal plate 295 for the top and the bottom plate 297, together with the washer 299, are provided to protect the insulation from the pressure of the screw heads and nuts. The insulating bushings 293 insulate the connecting stud 300 from the slip ring 287 through which it passes but to which it is not electrically connected. The connecting stud 302 because of its location, requires no similar insulating bushing. Further necessary electrical insulation is provided by the washers 303. The entire slip ring subassembly is built up on the sleeve 304 which is keyed to the hub of the cover 279.

Each collector ring 287 is in contact with a brush 301 held in a brush holder 306 by the pressure of the spring 311 acting through the pivoted pressure finger 313 attached to the stationary frame of the main gear box 5 by the support 305. One of each of the three studs 289, 300 and 302 is connected electrically to one of the three collector rings 287, and serves as a terminal post for the corresponding lead 284. This entire brush and collector ring subassembly is protected from grease and dirt by the cover 307 which connects with the conduit 309 for the electrical wiring, and which is attached to the frame 5 by the screws 308.

The brush holder 306 is held to the stationary gear box 5 by the usual type of construction of such equipment which comprises as shown more particularly in FIGS. 14 and 15, the screws 314, the supports 315 or 316 or 317, and the supports 318 or 319 or 305, the insulating washers 323, the washers 324, the studs 325, the nuts 326, and the pigtails 301a.

The Exhaust System

Referring to FIGS. 1, 2 and 3, an exhauster (not shown) is provided, which sucks air through the duct 327 from the chamber 328, which in turn sucks air from the exhaust tubes 280 and 281, which in turn suck air from the revolving mandrel 27 through the wire screen 329. This causes air to flow over the strip 33 being cut, carrying with it any dust or fines, and the air is deflected by the shaped undersurface 330 of the top bracket 13.

In order to cool the strip while it is being cut and the cutting edge of the tool, and to prevent wool from accumulating along the cutting edge, there is provided near each tool an air blast nozzle 331, connected by means of the reducing coupling 332 to an air pipe 333, which in turn is connected to the pressure chamber 334 in the tool holder bed casting 9. This chamber 334 is connected by the angle 335 to the conduit 336 which supplies cool air under pressure from a blower (not shown).

An important feature of the invention is the means used to collect the fibers of metal wool, as they are shaved from the strip. Referring to FIG. 1, the first metal wool fibers 337 cut from each knife are placed by hand over the guide 338 and partway about the collector cone 339, and carried over the guide 340 onto the lower belt 341 of the take-off subassembly. Subsequent fibers of wool are merely placed on the wool previously placed about the collector cone 339 and are thence carried by the wool ribbon already formed over the guide 340 onto the lower belt 341. Inasmuch as the take-off belt assembly is old in the art, it is shown diagrammatically. However, the cone collector is new and most useful, forming an important part of this invention, and is therefore shown in detail.

The collector cone 339 comprises the steel shell 342, covered exteriorly by the canvas 343 and supported interiorly by the top bracket 344 and the bottom bracket 345. These brackets carry at their centers antifriction bearings 346 and 347 so that the cone 339 may be rotated easily about the fixed vertical shaft 348 by means of the belt 349 which is held on the cone 339 by the tapered shape of the cone 339 and the flange 350 at its top.

The motor 351 by means of the vari drive 352 drives the shaft 353 by the chain 354, and the sprockets 355 and 356. The shaft 353 also rotates the pulley 357 which carries the lower belt 341, the tension on which is maintained by an adjustable idle pulley 358. The shaft 353 also carries the gear 359 which meshes with the gear 360 on the drive shaft 361. The shaft 361 rotates the pulley 363 thus moving the upper belt 364, the tension on which is maintained by the adjustable idle pulley 365. As the gears 360 and 359 have the same number of teeth and the pulleys 363 and 357 have the same diameter, the belts 364 and 341 travel at the same speed, and as they lie in close contact they carry the ribbon of wool fibers between them and discharge it at the end of the travel of the belt 341.

To summarize, by means of the electrical circuits, well known in the art, the elevator motor 274 is energized in a reverse direction at a speed higher than that used while cutting, as the pinion 265 has been rolled about the gear 262 out of contact with the pinion 268 until it has become disengaged. It is then engaged with the stationary segmental gear segment 277 which prevents its rotation, thus locking the gears 262 and 261 together causing the gear 262 to rotate at the same speed as the gear 261. This motion continues until, FIG. 2, the elevator base plate 239 contacts the cam 366 on the bell crank 367 which pivots on the stud 368 attached to the column 7, opening the motor circuit by means of the microswitch 369. The screw 370 with the lock nut 371 and the screw 372 with the lock nut 380 provide the means for necessary adjustment.

The pinion 265 is then unlocked and rolled back about the gear 262 until it meshes with the pinion 268 whereafter it is locked in that position. The mandrel 27, previously loaded with a coil of strip steel 33, FIGS. 3 and 4, is lowered into position on the rotor 41 and is held firmly attached thereto by the clamps 45. By means of a hoist (not shown) the chain of which is hooked into eyebolt 25, the shaft 348 carrying the cone 339 and the top subassembly including the top bracket 13 and the wool ribbon guides 338, is lowered into position and then clamped by means of the levers 15. The operator then pushes the tool holder slides 159 into cutting position so that the rollers 167 engage the cams 168 and maintains tension by the hooking springs 169. The machine is then started, and the knives 127 lowered into cutting position by raising pins 185. The exhauster and the blower are then started, and the cleaned ribbons of wool started about the wool collecting cone 339 on out through the take-off belts 341 and 364. By means of the varidrives, these belts are operated at a speed which gives the desired tension on the metal wool ribbon 337.

The motor 3 driving the steel wool machine also drives the shaft 180, the chain 183, the shafts 176 and the cams 168 as has above been described. The cams 168 are designed so as to traverse the knives 127 across the edge of the strip 33 being cut, so that any individual serrated cutting edge of the knife approximates the natural helix of the coiled strip, as it advances radially away from the center for a total travel of the desired predetermined number of coiled strip turns. Upon completion, the return stroke is very slow. In order, furthermore, to prevent one knife following in a track previously cut, all of the cams 168 are provided with slightly different profiles.

Oil or other cutting lubricant is supplied to the strip 33 being cut in advance of each group of knifes 127 by a lubricating pad holder 373, see FIG. 13, at the end of a conduit 374, slidably movable in the post 11 and which has one side adapted to hold a felt pad 375. In operating position, the pad holder 373 is pushed inward radially until the pad 375 is in the position shown in FIGS. 3 and 13, and then twisted 90° so that the pad 375 rests on the strip 33 and is held firmly in position by the plunger 376 under the influence of the spring 377. The cutting compound is then supplied through the conduit 374. The pad holder 373 is withdrawn into the post 11 when the mandrel 27 is raised for loading, first of course, raising the plunger 376 by means of the collar 378 attached to it by the pin 379.

Because the serrations of the knives used for cutting steel wool have been triangular in cross section, with the points or apices slightly rounded, steel wool has been frequently called triangular in cross section, of a shape approximating, highly magnified, that shown in FIG. 21. Over the past thirty years, after extended examinations under the microscope of a very large number of steel wool fibers, it was found that they universally take the shapes shown in FIG. 22. FIG. 22 is a cross section of a ribbon of many fibers of steel wool, highly magnified. Other shapes of fibers are shown in FIGS. 23 and 24. The product shown in FIG. 23 is made by drawing a metal wire very fine, and then passing it through rolls. The product of FIG. 24 is made by cutting a sheet or strip of metal transversely to its length. It has been found that the fibers shown in cross section were obtained by substituting a knife having no serrations for the serrated knives described hereinabove and this product has been called "angle grass." FIGS. 21, 22, 23, 24 25 and 26 have approximately the same degree of magnification. The fibers are shown in cross section in FIGS. 25 and 26.

From the foregoing, it will appear that the thickness of the fibers to be produced will vary and be predetermined. The importance of being able to produce fibers of a predetermined thickness will appear when consideration is taken that practice has found that the efficiency of the fibers for a given job depends largely upon the thickness of the fiber best suited for the job. As an instance, for soap pads, excellent results have been achieved when the fibers varied between .002 and .004 inch in thickness, for filters if the thickness varied between .004 and .006 inch, for camouflage in warfare if the thickness varied between .008 and .012 inch, and for abrasives if the thickness approached .0002 inch for the finer grades, and the thickness varied between .006 and .020 inch for the coarser grades.

In turn, the advantage of being able to replace the coil supporting mandrels results from the fact that excellent results have been achieved when the metal strip for some purposes approximates .037 inch in thickness, by 12.25 inches in width, and comes in five hundred foot lengths. When a strip of steel of this length and thickness is wound upon a mandrel having a core, the diameter of which is thirty-six inches, the mandrel plus the strip weighs about fifteen hundred pounds.

In view of the aforesaid detailed description, it will thus appear that, (1) after the mandrel 27 with the prewound strip 33 is secured on the rotor 41, (2) the cutting tool holders 139, 186 secured in place with the serrated knives 127 mounted on the frame 9 secured in cutting engagement with the exposed upper edges of the overlapping wraps of the strip 33, (3) the bracket 13 secured in position on the posts 11, the current to the motor 3 is turned on, the exhaust cover rotor 279 will be rotated with the shaft 75 and therewith carry the tubes 280 which in turn will rotate the base 239 and the rotor 41, (4) the uprights 241 secured to the base 239 extend through the rotor 41 into engagement with the stripper ring 29, (5) the actuation of the cams 168 will cause the serrated knives 127 to be periodically reciprocated across the upper exposed edges of the strip 33, all of the aforesaid actuation being drivingly connected to the motor 3. Simultaneously with the aforesaid actuation, the motor 274 will be actuated as the result of the control means including the roller 219 riding on the exposed edges of the strip 33 and the switch 234, see FIG. 4, and the train of gears, see FIGS. 9 and 10, including gears 275, 261, 262, 264, 263, worm 257 and worm wheel 255, the nut 245 will be periodically rotated in turn to raise the base 239, and thereby the uprights 241, in turn to raise or strip the stripper ring 29 in an upward direction on the mandrel 27 to maintain the upper exposed edges of the strip 33 in substantially uniform cutting pressure with the serrated cutting knives 127.

The exhaust system for removing foreign matter from the cutting knives 127 and the strip 33, see aforesaid under the caption "The Exhaust System," will be actuated simultaneously with the actuation of the motors 3 and 274.

Obviously if the cams 168 have different ratios of radial advance to radial return, the advance and return of the several tool holders 159 will also vary relative to one another in turn to follow paths of movement differing from one another.

Although the description of the method and apparatus has been more or less limited to the manufacture of metal wool from steel strip, it is of course obvious without departing from the general spirit of the invention that in place of steel strip there may be substituted strips of brass, copper, bronze, Monel, nickel and other non-ferrous or ferrous metal requiring only the modification of the speed of the machine, the weights on the tool holders, the cutting angles of the knives, the lubricating cutting compound, or all of them, to produce metal wool from the selected metal. Likewise by making the required adjustments as aforesaid, wool may be obtained from a strip of a plastic, a soap, a solid abrasive, a plastic impregnated with abrasives, or a cloth impregnated with a soap, a cleaning compound or a plastic, and the like. When the material is too stiff in the cold state to bend it readily into a coil, it may be made pliable enough by heating or warming the same while it is being placed on the mandrel, using any of the

I claim:

1. In a metal wool producing machine the combination of a frame, a rotor rotatably mounted in said frame, a mandrel mounted on said rotor for supporting a metal strip wound into a coil consisting of a plurality of overlapping wraps in engagement with one another, with the rotor mandrel and metal strip concentric to one another, and said mandrel including an inclined annular base portion for supporting said wraps in angularly inclined relation to one another with the exposed upper edges of the overlapping wraps successively tapering from a plane transverse to the axis of the coil to approach a conical surface and with the lower edges of said wraps resting upon said inclined annular base portion, a second frame, a plurality of cutting tools floatingly and pivotally mounted on said second frame at positions angularly spaced from one another, with the cutting edges of said tools extending generally parallel to the line of the upper edges of said wraps, means for yieldably urging said cutting tools into cutting engagement with said exposed upper edges in a direction generally parallel to the axis of said coil, so that each tool cuts metal wool leaving after the cutting a substantially conical surface which is substantially parallel to the surface existing on said coil just before the cutting, drive means operatively connected to said rotor for rotating said rotor and said coil relative to said cutting tools, means supporting said mandrel and said second frame for vertical movement relative to one another, drive means for causing vertical movement of said mandrel and said coil relative to said second frame, means for sensing the vertical position of the upper end of said coil and said second frame relative to one another, and control means responsive to said sensing means for controlling said drive means for causing relative movement of said mandrel and coil relative to said second frame and said cutting tools to maintain the exposed upper edges of said coil at proper cutting height relative to said cutting tools.

2. The combination as claimed in claim 1 in which said cutting tools are mounted in tool holders pivotally mounted on shafts which extend generally transversely to the axis of said rotor, said mandrel and said coil and wherein weights are suspended from opposite sides of said tool holders, the difference in the forces imposed by said weights serving to impose upon said tools the desired cutting pressure and said weights creating a substantial inertia against movement of said cutting tools to resist chattering thereof.

3. The combination as claimed in claim 1 having means for causing vertical movement of said mandrel comprising a main shaft extending coaxially of said rotor, said rotor being keyed to said main shaft for rotation therewith, said main shaft including a threaded portion, a traction nut threadedly engaging said threaded portion, a base member mounted on said mandrel for rotation therewith and for vertical movement relative thereto, said base member being keyed to said nut for vertical movement thereby but being rotatable relative thereto, said base member being mechanically linked to said mandrel for movement thereof, an elevator motor secured to said base member and geared to rotate said nut, said elevator motor being controlled by said sensing means for rotating said nut to cause vertical movement of said member, said mandrel and said coil in accordance with the height of the exposed upper edges of said coil.

4. In a metal wool producing machine having a plurality of angularly spaced cutting tools, a take-off for withdrawing metal wool fibers as they are cut by said cutting tools, said take-off comprising a generally cone-shaped collector arranged with its axis generally vertical and with its large end downwardly, said collector being mounted for rotation about said axis and having at its exterior surface a textured material affording substantial friction with said fibers, a plurality of fixed guides mounted at spaced positions around said collector, two substantially abutting endless conveyors extending along a generally horizontal line extending generally tangential to a central part of said cone, drive means for driving said endless conveyors at the same linear speed and for driving said cone so that said central portion moves at a peripheral speed substantially equal to the linear speed of said endless conveyors, whereby said strands move from each of said cutting tools in said machine through a respective one of said guides and thence around said collector for different angular distances, with all of the fibers from the respective cutting tools and guides passing at a single point from said collector between said endless conveyors, whereby said fibers are withdrawn continually through said guides around said collector and between said endless conveyors.

References Cited in the file of this patent

UNITED STATES PATENTS

| | | |
|---|---|---|
| 177,826 | Glue | May 23, 1876 |
| 662,392 | Buhne | Nov. 27, 1900 |
| 881,852 | Gamage | Mar. 10, 1908 |
| 888,124 | Shedlock | May 19, 1908 |
| 1,419,472 | Schoniter | June 13, 1922 |
| 1,886,661 | Field | Nov. 8, 1932 |
| 1,976,013 | Field | Oct. 9, 1934 |
| 2,162,019 | Johnson | June 13, 1939 |
| 2,287,879 | Hennessy | June 30, 1942 |
| 2,352,443 | Mautsch | June 27, 1944 |
| 2,358,868 | Marx | Sept. 26, 1944 |
| 2,462,090 | Galvin | Feb. 22, 1949 |
| 2,605,741 | Field | Aug. 5, 1952 |
| 2,700,811 | Field | Feb. 1, 1955 |
| 2,700,812 | Field | Feb. 1, 1955 |

FOREIGN PATENTS

| | | |
|---|---|---|
| 1,108,545 | France | Aug. 31, 1955 |